United States Patent
Gong

(10) Patent No.: US 12,175,049 B2
(45) Date of Patent: Dec. 24, 2024

(54) TOUCH PANEL AND MOBILE TERMINAL WITH IMPROVED WRITING RELIABILITY

(71) Applicant: WUHAN CHINA STAR OPTOELECTRONICS SEMICONDUCTOR DISPLAY TECHNOLOGY CO., LTD., Hubei (CN)

(72) Inventor: Houfu Gong, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 233 days.

(21) Appl. No.: 17/597,021

(22) PCT Filed: Nov. 8, 2021

(86) PCT No.: PCT/CN2021/129305
§ 371 (c)(1),
(2) Date: Dec. 22, 2021

(87) PCT Pub. No.: WO2023/065412
PCT Pub. Date: Apr. 27, 2023

(65) Prior Publication Data
US 2023/0273700 A1 Aug. 31, 2023

(30) Foreign Application Priority Data
Oct. 20, 2021 (CN) .......................... 202111222476.6

(51) Int. Cl.
*G06F 3/045* (2006.01)
*G06F 3/044* (2006.01)

(52) U.S. Cl.
CPC .. *G06F 3/0446* (2019.05); *G06F 2203/04111* (2013.01)

(58) Field of Classification Search
CPC ..................... G06F 3/0446; G06F 2203/04111
(Continued)

(56) References Cited

U.S. PATENT DOCUMENTS

| | | | | |
|---|---|---|---|---|
| 2012/0062472 A1* | 3/2012 | Yilmaz | ................. | G06F 3/0448 345/173 |
| 2014/0092051 A1* | 4/2014 | Weinerth | .............. | G06F 3/0443 345/174 |

(Continued)

FOREIGN PATENT DOCUMENTS

| | | |
|---|---|---|
| CN | 106249977 A | 12/2016 |
| CN | 106293209 A | 1/2017 |

(Continued)

OTHER PUBLICATIONS

International Search Report in International application No. PCT/CN2021/129305, mailed on Jun. 24, 2022, with English translation.
(Continued)

*Primary Examiner* — Jonathan M Blancha
(74) *Attorney, Agent, or Firm* — HSML P.C.

(57) ABSTRACT

Provided is a touch panel and a mobile terminal. A touch layer of the touch panel comprises a touch electrode group located in a display area; a touch lead group located at least in a non-display area and electrically connected to the touch electrode group; and an extended electrode group overlapping at least a portion of the touch lead group located in the non-display area. The touch electrode group and the extended electrode group are electrically connected to a target function chip located in the non-display area to achieve a target function.

12 Claims, 8 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2019/0265820 A1* | 8/2019 | Li | ........................... H01L 24/42 |
| 2020/0089343 A1* | 3/2020 | Kadowaki | ............. G06F 3/0442 |
| 2021/0004126 A1 | 1/2021 | Jang et al. | |
| 2021/0064162 A1 | 3/2021 | Yin et al. | |
| 2021/0173506 A1* | 6/2021 | Yoshida | ................ G06F 3/0446 |

FOREIGN PATENT DOCUMENTS

| | | |
|---|---|---|
| CN | 108958539 A | 12/2018 |
| CN | 208819186 U | 5/2019 |
| CN | 109917964 A | 6/2019 |
| CN | 110908541 A | 3/2020 |
| CN | 111708464 A | 9/2020 |
| CN | 112328117 A | 2/2021 |
| CN | 112965638 A | 6/2021 |
| CN | 113010042 A | 6/2021 |
| CN | 113204294 A | 8/2021 |

OTHER PUBLICATIONS

Written Opinion of the International Search Authority in International application No. PCT/CN2021/129305, mailed on Jun. 24, 2022, with English translation.
Chinese Office Action issued in corresponding Chinese Patent Application No. 202111222476.6 dated Apr. 20, 2023, with English translation.

* cited by examiner

TOUCH PANEL AND MOBILE TERMINAL WITH IMPROVED WRITING RELIABILITY

TECHNICAL FIELD

The present application relates to the technical field of display, and in particular, to the technical field of display panel manufacturing, and specifically to a touch panel and a mobile terminal.

BACKGROUND

With the continuous development of display industry, a narrow bezel display panel is applied in order to meet people's higher requirements and experience for visual effects.

At present, for a touch panel integrated with writing function of an active pen, due to the limitation of a narrow bezel and a space occupation of an internal circuit of the frame, there is not enough space for placing a touch electrode inside the frame, so existing touch electrode can only be arranged flush with an edge of a display area. Therefore, when an active pen operates on an edge of a touch panel, a channel on one side of the touch electrode at the edge of a display area away from the center of a display area will be missing or incomplete, resulting in missing or reduction of touch signal data of this channel, which reduces writing reliability of an active pen on an edge of a touch panel.

Therefore, the active pen writing function of existing touch panel has defects and needs to be improved.

Technical Problem

Embodiments of the present application provide a touch panel and a mobile terminal, so as to solve the problem that a channel on one side of the touch electrode at the edge of a display area away from the center of a display area will be missing or incomplete, resulting in missing or reduction of touch signal data of this channel, which reduces writing reliability of an active pen on an edge of a touch panel.

Technical Solution

An embodiment of the present application provides a touch panel, wherein the touch panel comprises a display area and a non-display area surrounding the display area, the touch panel comprises a touch layer, and the touch layer comprises:
  a touch electrode group located in the display area;
  a touch lead group located at least in the non-display area and electrically connected to the touch electrode group;
  an extended electrode group overlapping at least a portion of the touch lead group located in the non-display area;
  wherein the touch electrode group and the extended electrode group are electrically connected to a target function chip located in the non-display area to achieve a target function;
  wherein the touch electrode group comprises a plurality of first electrode groups, a plurality of the first electrode groups and the extended electrode groups are arranged in parallel along a first direction and extend along a second direction, and the extended electrode groups are located at least on one side of the plurality of first electrode groups close to the non-display area; and
wherein a plurality of the touch electrode group and the extended electrode group comprise a metal grid, and the touch electrode group and the extended electrode group are arranged in an insulating manner through a fracture of the metal grid.

In an embodiment, in two of the first electrode groups close to the extended electrode group, an area of the extended electrode group is greater than or equal to an area of one of the first electrode groups, and is less than or equal to an area of the other of the first electrode groups.

In an embodiment, the touch electrode group further comprises:
  a plurality of second electrode groups arranged in parallel and intersecting with a plurality of the first electrode groups; and
  wherein the touch lead group comprises a plurality of second leads located in the non-display area and corresponding one by one to a plurality of the second electrode groups, each of the second leads is connected to a portion of the corresponding second electrode group close to the extended electrode group, and the extended electrode group and a plurality of the second leads are disposed opposite to each other.

In an embodiment, the extended electrode group is located within a range defined by a portion of the corresponding plurality of the second leads within the non-display area.

In an embodiment, in the first direction, a plurality of the second electrode groups extend from the display area to the non-display area, and one side of a plurality of the second electrode groups away from the display area is flush with one side of the extended electrode groups away from the display area.

In an embodiment, each of the second electrode groups comprises a plurality of second electrode portions arranged along the first direction, and the first electrode group and a bridge portion located in a different layer are provided between two adjacent second electrode portions; and
  wherein the bridge portion and the corresponding first electrode group are insulated, each of the second leads and the corresponding plurality of bridge portions are arranged in the same layer, and the bridge portion close to the extended electrode group extends to be connected to the corresponding second lead.

In an embodiment, a plurality of the second electrode groups do not extend beyond the display area, one side of a plurality of the second electrode groups close to the non-display area is flush with one side of a plurality of the first electrode groups close to the non-display area; and
  wherein the extended electrode group does not extend beyond the non-display area, and one side of the extended electrode group away from the display area is parallel to one side of the display area close to the extended electrode group.

In an embodiment, the touch lead group further comprises a plurality of first leads located in the non-display area and corresponding one by one to a plurality of the first electrode groups, each of the first leads is connected to the corresponding first electrode group, and the touch layer further comprises:
  a first extended lead between a plurality of the first leads and a plurality of the second leads, the first extended lead connected to the extended electrode group; and
  wherein, when the touch electrode group and the extended electrode group are electrically connected to the target functional chip located in the non-display area, the first extended lead and the touch lead group transmit an inductive signal, otherwise, the first extended lead is electrically grounded.

An embodiment of the present application provides a touch panel, wherein the touch panel comprises a display area and a non-display area surrounding the display area, the touch panel comprises a touch layer, and the touch layer comprises:

a touch electrode group located in the display area;

a touch lead group located at least in the non-display area and electrically connected to the touch electrode group;

an extended electrode group overlapping at least a portion of the touch lead group located in the non-display area; and wherein the touch electrode group and the extended electrode group are electrically connected to a target function chip located in the non-display area to achieve a target function.

In an embodiment, the touch electrode group comprises:

a plurality of first electrode groups, a plurality of the first electrode groups and the extended electrode groups are arranged in parallel along a first direction and extend along a second direction, and the extended electrode groups are located at least on one side of the plurality of first electrode groups close to the non-display area.

In an embodiment, in two of the first electrode groups close to the extended electrode group, an area of the extended electrode group is greater than or equal to an area of one of the first electrode groups, and is less than or equal to an area of the other of the first electrode groups.

In an embodiment, the touch electrode group further comprises:

a plurality of second electrode groups arranged in parallel and intersecting with a plurality of the first electrode groups; and wherein the touch lead group comprises a plurality of second leads located in the non-display area and corresponding one by one to a plurality of the second electrode groups, each of the second leads is connected to a portion of the corresponding second electrode group close to the extended electrode group, and the extended electrode group and a plurality of the second leads are disposed opposite to each other.

In an embodiment, the extended electrode group is located within a range defined by a portion of the corresponding plurality of the second leads within the non-display area.

In an embodiment, in the first direction, a plurality of the second electrode groups extend from the display area to the non-display area, and one side of a plurality of the second electrode groups away from the display area is flush with one side of the extended electrode groups away from the display area.

In an embodiment, each of the second electrode groups comprises a plurality of second electrode portions arranged along the first direction, and the first electrode group and a bridge portion positioned in a different layer are provided between two adjacent second electrode portions; and wherein the bridge portion and the corresponding first electrode group are insulated, each of the second leads and the corresponding plurality of bridge portions are arranged in the same layer, and the bridge portion close to the extended electrode group extends to be connected to the corresponding second lead.

In an embodiment, a plurality of the second electrode groups do not extend beyond the display area, one side of a plurality of the second electrode groups close to the non-display area is flush with one side of a plurality of the first electrode groups close to the non-display area; and wherein the extended electrode group does not extend beyond the non-display area, and one side of the extended electrode group away from the display area is parallel to one side of the display area close to the extended electrode group.

In an embodiment, the touch lead group further comprises a plurality of first leads located in the non-display area and corresponding one by one to a plurality of the first electrode groups, each of the first leads is connected to the corresponding first electrode group, and the touch layer further comprises:

a first extended lead between a plurality of the first leads and a plurality of the second leads, the first extended lead connected to the extended electrode group; and wherein, when the touch electrode group and the extended electrode group are electrically connected to the target functional chip located in the non-display area, the first extended lead and the touch lead group transmit an inductive signal, otherwise, the first extended lead is electrically grounded In an embodiment, each of the first electrode groups comprises a plurality of electrode blocks arranged in an insulating manner along the second direction, and the touch lead group further comprises:

a plurality of third lead groups corresponding one by one to the plurality of first electrode groups, the third lead groups comprising a plurality of electrode leads corresponding to a plurality of the electrode blocks in the corresponding first electrode groups, each electrode lead is connected to one side of the corresponding electrode block close to the extended electrode group;

wherein the extended electrode group comprises a plurality of extended electrode blocks arranged in an insulating manner along the second direction, and the plurality of extended electrode blocks are disposed opposite to a plurality of the electrode leads corresponding to the first electrode group of the non-display area.

In an embodiment, a plurality of the touch electrode group and the extended electrode group comprise a metal grid, and the touch electrode group and the extended electrode group arranged in an insulating manner through a fracture of the metal grid.

An embodiment of the present application provides a mobile terminal, which comprises a terminal body and the touch panel as described above, and the terminal body and the touch panel are integrated.

Technical Effects

Embodiments of the present application provide a touch panel and a mobile terminal. The touch panel comprises a display area and a non-display area surrounding the display area, the touch panel comprises a touch layer, and the touch layer comprises: a touch electrode group located in the display area; a touch lead group located at least in the non-display area and electrically connected to the touch electrode group; and an extended electrode group overlapping at least a portion of the touch lead group located in the non-display area; wherein the touch electrode group and the extended electrode group are electrically connected to a target function chip located in the non-display area to achieve a target function. Wherein, in the solution of the present application, the extended electrode group which realizes the target function together with the touch electrode group is further arranged in the portion overlapping the touch lead group located in the non-display area, so that the portion of the touch electrode group close to an edge of the display area can still keep a complete channel or have an adjacent channel in the direction away from the display area, thereby reducing the risk of missing or incomplete channels related to a portion of the touch lead group close to an edge of the display area, and improving the writing reliability of an active pen on an edge of the touch panel.

BRIEF DESCRIPTION OF THE DRAWINGS

The technical solutions and other beneficial effects of the present application will be apparent from the detailed description of the specific embodiments of the present application with reference to the accompanying drawings.

DETAILED DESCRIPTION

Hereinafter, technical solution in embodiments of the present application will be clearly and completely described with reference to the accompanying drawings in embodiments of the present application. Apparently, the described embodiments are portion of, but not all of, the embodiments of the present application. All the other embodiments, obtained by a person with ordinary skill in the art on the basis of the embodiments in the present application without expenditure of creative labor, belong to the protection scope of the present application.

In the description of the present application, the terms "first", "second", etc. are used for descriptive purposes only and cannot be understood as indicating or implying relative importance or implicitly indicating the number of technical features. Thus, the features defined by "first" and "second" may explicitly or implicitly comprise one or more of the described features. In the description of this application, "a plurality of" means two or more, unless otherwise specifically defined, "electrically connected" means that the they are electrically conductive and are not limited to direct or indirect connection. In addition, it should be noted that the attached drawings only provide a structure closely related to the present application, and some details not related to the application are omitted, which aim at simplifying the drawings to make the invention points clear at a glance, instead of indicating that the actual device is the same as the drawings and is not a limitation of the actual device.

Embodiments of the present application provide a touch panel comprising but not limited to the following embodiments and any combinations thereof.

Figure 1:
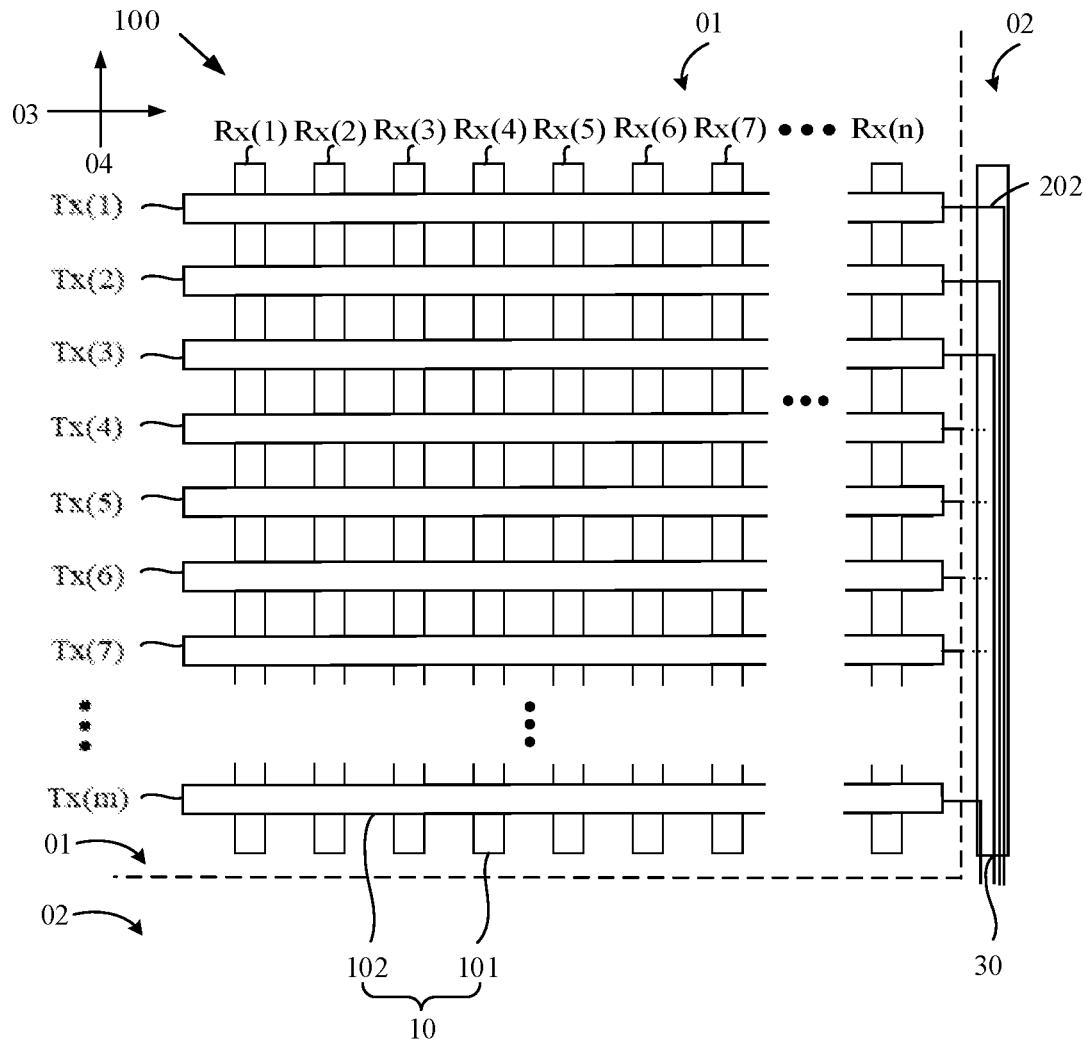
FIG. 1 is a schematic top view of a first touch layer according to an embodiment of the present application.

In an embodiment, as shown in FIG. 1, the touch panel comprises a display area 01 and a non-display area 02 surrounding the display area. The touch panel comprises a touch layer 100, and the touch layer 100 comprises: a touch electrode group 10 located in the display area 01; a touch lead group located at least in the non-display area 02 and electrically connected to the touch electrode group 10; and an extended electrode group 30 overlapping at least a portion of the touch lead group located in the non-display area 02; wherein the touch electrode group 10 and the extended electrode group 30 are electrically connected to a target function chip located in the non-display area 02 to achieve a target function.

Wherein, the display area 01 may be in one of a regular shape such as a rectangle, a circle, a triangle, or may be in an irregular shape, and the non-display area 02 may fully surround or partially surround the display area 01. Here, the display area 01 comprising an edge of two intersecting straight line segments, and the non-display area 02 arranged around the edge of the two intersecting straight line segments in the display area 01 is taken as an example for description. Specifically, as shown in FIG. 1, the extended electrode group 30 may be located in the non-display area 02 and not in the display area 01, or the extended electrode group 30 may be partially located in the non-display area 02 and partially located in the display area 01. Specifically, the shape and specific structure of the touch electrode group 10 and the extended electrode group 30 are not limited herein, and at least one of the two may be, but is not limited to, a strip electrode or an engaged arrangement.

Wherein, the touch electrode group 10 located in the display area 01 can realize, but is not limited to, a touch function. Further, the touch lead group electrically connected to the touch electrode group 10 may transmit a signal to the touch electrode group 10 or transmit a signal generated by the touch electrode group 10 to a corresponding chip. In particular, the extended electrode group 30 located at least in the non-display area 02 and overlapped at least with the touch lead group and the touch electrode group 10 located in the display area 01 may be electrically connected to the target function chip to achieve the target function. The target function may be, but is not limited to, a writing function of an active pen. The writing function of the target function is taken as an example herein for description. That is, in this embodiment, the area where the portion of the touch lead group located in the non-display area 02 is multiplexed, so that the area used to achieve the target function can cover the non-display area 02 without increasing the size of the narrow bezel, thus the portion of the touch electrode group 10 close to an edge of the display area 01 may still keep a complete channel or have an adjacent channel in the direction away from the display area 01, thereby reducing the risk of missing or incomplete channels related to a portion of the touch lead group close to an edge of the display area 01, and improving the writing reliability of an active pen on an edge of the touch panel.

Figure 2:
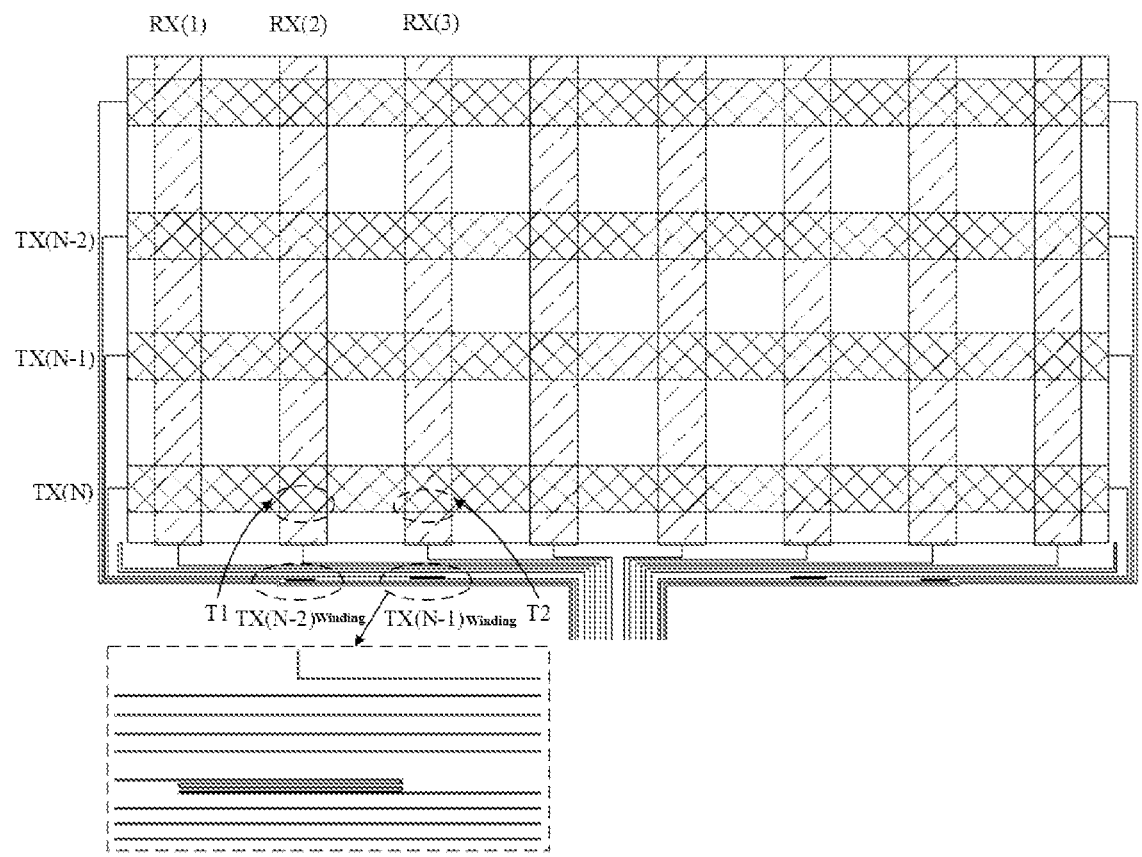
FIG. 2 is a schematic relevant structural diagram for explaining the principle in FIG. 1 according to an embodiment of the present application.

Wherein, with reference to the above discussion, the target function may be a feedback function for an active pen to write on the touch panel. Further, as for the description of "the area used to achieve the target function can cover the non-display area 02 without increasing the size of the narrow bezel, thus the portion of the touch electrode group 10 close to an edge of the display area 01 may still keep a complete channel or have an adjacent channel in the direction away from the display area 01, thereby reducing the risk of missing or incomplete channels related to a portion of the touch lead group close to an edge of the display area 01, and improving the writing reliability of an active pen on an edge of the touch panel" in the present embodiment, it may be understood as follows:

As shown in FIG. 2, when an active pen writes on a touch panel, a plurality of touch emitting electrodes Tx and a plurality of touch sensing electrodes Rx can receive signals of the active pen, and generally, coordinate calculation is performed based on the sensed signals of three consecutive touch emitting electrodes Tx or three consecutive touch sensing electrodes Rx.

When the pen tip is placed in an overlapping portion of RX(2) and TX(N) close to a lower edge T1, on the one hand, for the direction in which RX(2) extends, since TX(N–2) comprises a TX(N–2) winding located in the non-display area (the winding agglomertes and is similar to a small sensor), which will lead to the signal amount sensed by TX(N–2) is larger than the signal amount sensed by TX(N–1) and TX(N), so that the weight of the TX(N–2) is high, and the calculated coordinates are offset, which is embodied as the written line is closer to the TX(N–2). On the other hand, RX(1) is relative to RX(2), since the plurality of TX corresponding to RX(1) are no subjected to a winding process in the direction in which RX(1) extends, the signal amount sensed by RX(2) is larger than the signal amount sensed by RX(1), and similarly, the calculated coordinates are offset.

When the pen tip is placed in an overlapping portion of RX(3) and TX(N) close to a lower edge T2, on the one hand, for the direction in which RX(3) extends, since RX(3) comprises a TX(N–1) winding located in the non-display area (the winding agglomertes and is similar to a small sensor), which will lead to the signal amount sensed by the TX(N–1) is larger than the signal amount sensed by TX(N–2) and TX(N), so that the weight of the TX(N–1) is high, and the calculated coordinates are offset, which is embodied as the written line is closer to the TX(N–1). On the other hand, RX(1) is relative to RX(3), since the plurality of TX corresponding to RX(1) are no subjected to a winding process in the direction in which RX(1) extends, the signal amount sensed by RX(3) is larger than the signal amount sensed by RX(1), and similarly, the calculated coordinates are offset.

In summary, with reference to FIG. 1 and FIG. 2, in this embodiment, the portion of touch electrode group 10 for realizing the target function close to an edge of the display area 01 is also occupied in a direction away from the display area 01, which is equivalent to effectively increasing the sensing amount of the touch electrode group 10 under the condition that the touch electrode group in the prior art is missing or incomplete, so as to compensate for the missing or deficiency of the sensing amount of the touch electrode group in the prior art, so that the writing reliability of an active pen at the edge of the touch panel can be improved.

In an embodiment, as shown in FIG. 1, the touch electrode group 10 comprises a plurality of first electrode groups 101, a plurality of the first electrode groups 101 and the extended electrode groups 30 are arranged in parallel along a first direction 03 and extend along a second direction 04, and the extended electrode groups 30 are located at least on one side of the plurality of first electrode groups 101 close to the non-display area 02.

Wherein, the first direction 03 may be, but is not limited to, a horizontally leftward or horizontally rightward direction, and the second direction 04 may be, but is not limited to, a vertically upward or vertically downward direction. The second direction 04 is a vertically upward or vertically downward direction, and the first direction 03 is a horizontally leftward or horizontally rightward direction are taken as examples herein for description, that is, a plurality of the first electrode groups 101 and the extended electrode groups 30 extend in the vertical direction and are arranged in the horizontal direction. Specifically, since a plurality of the first electrode group 101 and the extended electrode group 30 are arranged in parallel, they may be arranged in the same layer or different layers, and the arrangement of the two in the same layer is taken as an example herein for description. and the arrangement of the first electrode group 101 and the extended electrode group 101 may be arranged in an insulating manner between two adjacent first electrode groups 101 and between the first electrode group 101 and the extended electrode group 30. Then there may be a space between two adjacent first electrode groups 101, and between the first electrode group 101 and the extended electrode group 30 for insulation.

It should be noted that, as shown in FIG. 1, the touch lead group may be located in at least one of the left and right sides of the display area 01. According to the above discussion, the extended electrode group 30 may also be located in at least one of the left and right sides of the display area 01, so as to multiplex the area where the portion of the touch lead group located in the non-display area 02, so that the area used to achieve the target function can cover the non-display area 02 without increasing the size of the narrow bezel, thus the portion of the touch electrode group 10 close to an edge of the display area 01 may still keep a complete channel or have an adjacent channel in the direction away from the display area 01, thereby reducing the risk of missing or incomplete channels related to a portion of the touch lead group close to an edge of the display area 01, and improving the writing reliability of an active pen on an edge of the touch panel.

In an embodiment, as shown in FIG. 1, in two of the first electrode groups 101 close to the extended electrode group 30, an area of the extended electrode group 30 is greater than or equal to an area of one of the first electrode groups 101, and is less than or equal to an area of the other of the first electrode groups 101.

Figure 3:
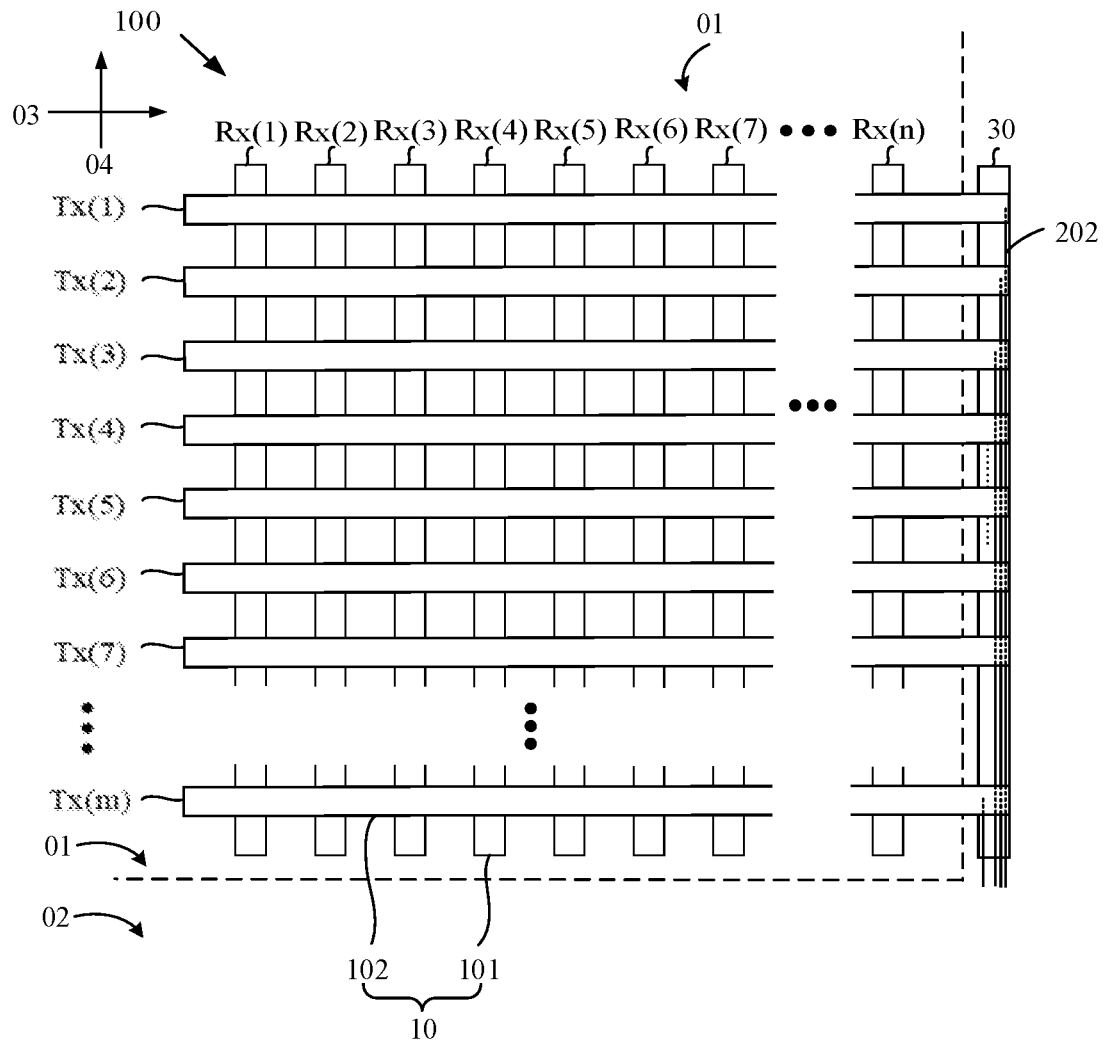
FIG. 3 is a schematic top view of a second touch layer according to an embodiment of the present application.

Specifically, as shown in FIGS. 1 and 3, the touch layer 100 may comprise n pieces of first electrode groups 101 arranged along the first direction 03. The first electrode groups 101 may be a touch sensing electrode Rx, that is, in the first direction 03, the first electrode groups 101 of the first column to the first electrode groups 101 of the $n_{th}$ column may be Rx(1), Rx(2) . . . and Rx(n) in sequence. Herein, the extended electrode group 30 of the first electrode groups Rx(n) close to the $n_{th}$ column is taken as an example for description. In combination with the above discussion, the area of the extended electrode group 30 in this embodiment is within a range defined by the area of the first electrode group Rx(n) and the area of the first electrode group Rx(n–1), so that the area difference among the first electrode group Rx(n–1), the first electrode group Rx(n) and the extended electrode group 30 can be reduced to a large extent. It can be understood that when the plurality of the first electrode groups 101 are determined, the areas of the first electrode group Rx(n) and the first electrode group Rx(n–1) may be different due to process errors or special design, etc. In this embodiment, the area of the first electrode group Rx(n) and the area of the first electrode group Rx(n–1) are used as two boundaries of the area of the extended electrode group 30, so that the area differences between every two of the first electrode group Rx(n), the first electrode group Rx(n−1), and the extended electrode group 30 can be minimized. That is, the areas of the first electrode group Rx(n), the first electrode group Rx(n−1), and the extended electrode group 30 can be approached in the same direction. Under the condition that an active pen sends a signal to the first electrode group Rx(n), the first electrode group Rx(n−1), and the extended electrode group 30, the influence of the area difference of the three on the received signal of the three is reduced, and the proportion of correlation between the received signal of the three and the signal sent to the three by an active pen is increased, which further improves the writing reliability of an active pen on an edge of the touch panel.

In an embodiment, as shown in FIGS. 1 and 3, the touch electrode group 102 further comprises a plurality of second electrode groups 102 arranged in parallel and intersecting with a plurality of the first electrode groups 101. Wherein, the touch lead group comprises a plurality of second leads located in the non-display area 02 and corresponding one by one to a plurality of the second electrode groups 102, each of the second leads 202 is connected to a portion of the corresponding second electrode group 102 close to the extended electrode group 30, and the extended electrode group 30 and a plurality of the second leads 202 are disposed opposite to each other.

In this embodiment, the direction in which the plurality of the second electrode groups 102 are arranged and the direction in which the plurality of the second electrode groups 102 extend are not limited, and it only needs to meet the requirement that a plurality of the second electrode groups 102 and a plurality of the first electrode groups 101 may be intersected to form a plurality of capacitors to realize the mutual capacitance type touch function. Herein, a plurality of the second electrode groups 102 may be arranged in parallel along the first direction 03 and extend along the second direction 04 are taken as examples for description. That is, a plurality of the second electrode groups 102 and a plurality of the first electrode groups 101 may be vertically arranged. Further, a plurality of the second electrode groups 102 and a plurality of the extended electrode groups 30 may extend along a horizontal direction and be arranged along a vertical direction. Wherein there may be a space between the two adjacent first electrode groups 101, the two adjacent second electrode groups 102, and the first electrode groups 101 for insulation. Further, since a plurality of the first electrode group 101 and the extended electrode group 30 intersect with a plurality of the first electrode group 101, herein, a plurality of the first electrode group 101 and the extended electrode group 30 are arranged in the same layer are taken as examples for description, then at least the portion of each second electrode group 102 that intersects with the first electrode group 101 and the extended electrode group 30 is arranged in a different layer from any one of the above first electrode group 101 and the extended electrode group 30.

Specifically, as shown in FIG. 1, the touch layer 100 may comprise m pieces of second electrode groups 102 arranged along the second direction 04. The second electrode groups 102 may be a touch emitting electrode Tx, that is, in the second direction 04, the second electrode groups 102 of the first row to the second electrode groups 102 to the second electrode groups 102 of the $m_{th}$ row may be Tx(1), Tx(2) . . . and Tx(n) in sequence. Wherein, during a touch function stage, a plurality of the first electrode group 101 are sequentially loaded with a touch driving signal. Specifically, when the first piece of the first electrode group 101 is loaded with a touch driving signal, a plurality of touch sensing signals generated by a plurality of the second electrode groups are sequentially transmitted to a touch function chip through the corresponding plurality of second leads 202. When the touch function chip completes receiving a plurality of touch sensing signals generated by a plurality of the second electrode groups, the touch function chip then loads the touch driving signal to the second piece of the first electrode group 101, and so on, until the last piece of the first electrode group 101 is loaded with a touch driving signal, and the touch function chip completes receiving a plurality of touch sensing signals generated by a plurality of the second electrode group.

It should be noted that, as shown in FIG. 1, a plurality of the second electrode groups 102 may not extend beyond the display area 102, and a plurality of the second leads 202 may be arranged in the same layer and connected with a plurality of the second electrode groups 102. As shown in FIG. 3, a plurality of the second electrode groups 102 may extend beyond the display area 01, and then a plurality of the second leads 202 may be arranged in different layers and overlapped with a plurality of the second electrode groups 102. It can be understood that, at least a plurality of the second leads 202 located in the non-display area 102 are connected to a portion of a plurality of the second electrode groups 102 close to the extended electrode group 30 to transmit a touch sensing signal. In this embodiment, the extended electrode group 30 and a plurality of the second leads 202 are arranged opposite to each other, so that the size of the non-display area 02 can be prevented from being additionally increased, which is beneficial to the development of the narrow bezel of the touch panel.

In an embodiment, as shown in FIG. 1, the extended electrode group 30 is located within a range defined by a portion of the corresponding plurality of second leads 202 located within the non-display region 02. Specifically, each of the second leads 202 comprises a portion connected to the corresponding second electrode group 102 and located in the display region 01, and a portion extending to the non-display region 02 to be connected to a touch function chip. It can be understood that the extended electrode group 30 in this embodiment does not extend beyond the range defined by the portion of the corresponding plurality of second leads 202 located in the non-display area 02. That is, in the first direction 03, the size of the extended electrode group 30 may be relative small, although it may be smaller than the size of the first electrode group 101, but the size of the non-display area 02 can be prevented from being additionally increased, which is beneficial to the development of the narrow bezel of the touch panel.

In an embodiment, as shown in FIG. 3, in the first direction 03, a plurality of the second electrode groups 102 extend from the display area 01 to the non-display area 02, and one side of a plurality of the second electrode groups 102 away from the display area 01 is flush with one side of the extended electrode groups 30 away from the display area 01. It can be understood that a plurality of the second electrode groups 102 in this embodiment extend from the display area 01 to the non-display area 02. When realizing the target function, since the area of the second electrode groups 102 increases, that is, the area for sensing the trigger of an active pen increases, the response accuracy of each of the second electrode groups 102 to the trigger of an active pen can be improved. At the same time, one side of a plurality of the second electrode groups 102 away from the display area 01 is flush with one side of the extended electrode groups 30, it is possible to prevent a plurality of the second electrode groups 102 from additionally occupying the area except the extended electrode groups 30 in the non-display area 02, which is beneficial to the development of the narrow frame of the touch panel, meanwhile, it is also possible to prevent the risk that the extended electrode groups 30 protrude from the touch electrode groups 10 to cause the extended electrode groups 30 to break.

Figure 4:
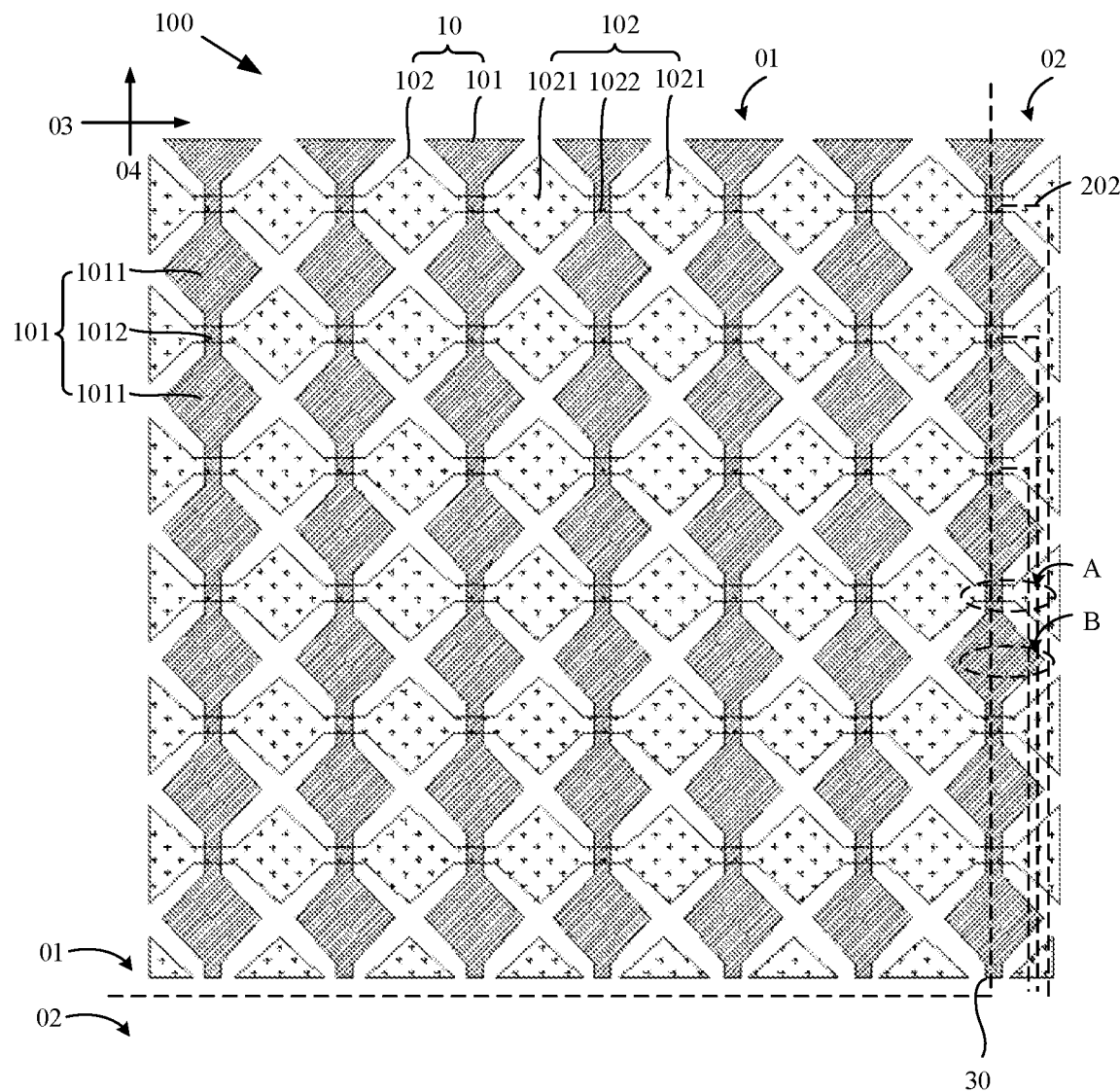
FIG. 4 is a schematic top view of a third touch layer according to an embodiment of the present application.

Further, as shown in FIG. 4, a plurality of the first electrode group 101 and the extended electrode group 30 may be arranged in engagement with a plurality of the second electrode group 102, so as to increase their facing areas to further increase the parasitic capacitance between them, and meanwhile, the capacitance change amount of the parasitic capacitance between them is effectively increased. It should be noted that in this case, since a plurality of the first electrode group 101 and the extended electrode group 30 may be arranged in engagement with a plurality of the second electrode group 102, and in order to maintain the consistency of the shapes of the extended electrode group 30 and a plurality of the first electrode group 101, one side of the extended electrode group 30 away from the display area 01 may show a plurality of protruding shapes. In this case, a plurality of the second electrode group 102 may be arranged to extend from the display area 01 to the non-display area 02, and one side of the second electrode group 102 away from the display area 01 is flush with one side of the extended electrode group 30 away from the display area 01. That is, the shape of each of the second electrode groups 102 close to the extended electrode group 30 may match a concave shape between two adjacent protruding shapes in one side of the extended electrode group 30 away from the display area 01, so as to prevent an outer side of a side of the touch layer 100 where the extended electrode group 30 is arranged from showing multiple protruding shapes, thus reducing the risk of fracture or even failure of the extended electrode group 30.

Figure 5:
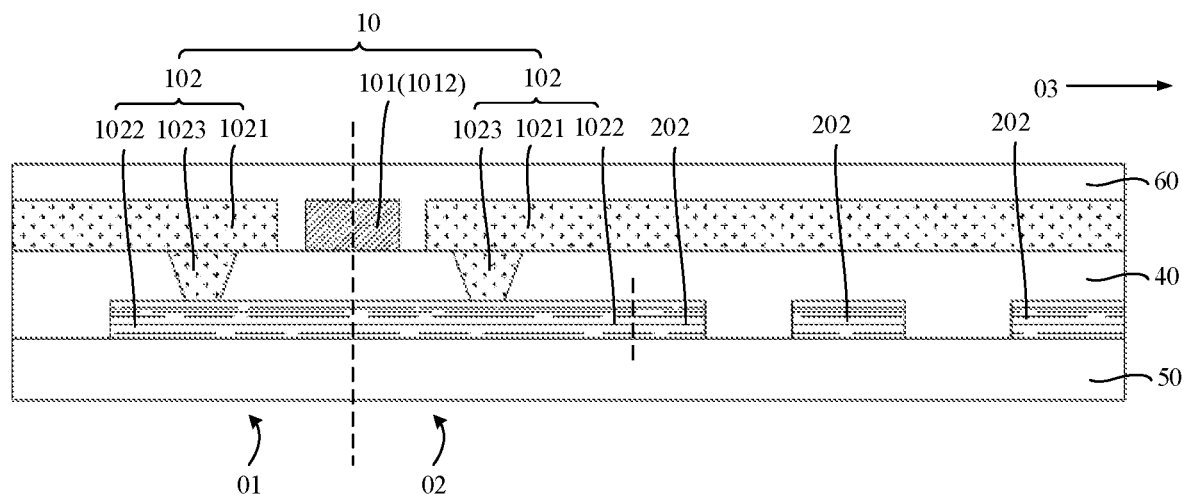
FIG. 5 is a schematic cross-sectional view of a touch panel according to an embodiment of the present application.
Figure 6:
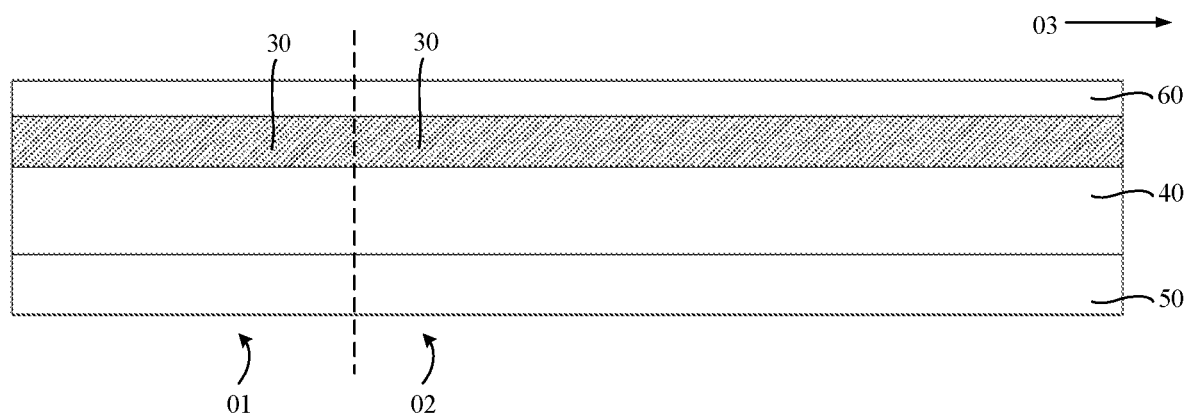
FIG. 6 is a schematic cross-sectional view of another touch panel according to an embodiment of the present application.

In an embodiment, as shown in FIGS. 4 to 6, FIG. 5 is a cross-sectional view of a region A in FIG. 4 in the first direction 03, FIG. 6 is a cross-sectional view of a region B in FIG. 4 in the first direction 03. Each of the second electrode groups 102 comprises a plurality of second electrode portions 1021 arranged along the first direction 03, and the first electrode groups 101 and a bridge portion 1022 located in a different layer are provided between two adjacent second electrode portions 1021. Wherein, the bridge portion 1022 and the corresponding first electrode group 101 are insulated, each of the second lead wires 202 and the corresponding plurality of bridging portions 1022 are arranged in the same layer, and the bridge portion 1022 close to the extended electrode group 30 extends to be connected to the corresponding second lead 202.

Specifically, as shown in FIG. 4, each of the first electrode groups 101 may comprise a plurality of first electrode portions 1011 arranged along the second direction 04, and two adjacent first electrode portions 1011 are electrically connected by connecting portions 1012, wherein the connecting portions 1012 and the bridge portions 1022 correspond to each other one by one. Specifically, as shown in FIGS. 5 to 6, the first electrode portion 1011, the connection portion 1012, the extended electrode group 30, and the second electrode portion 1021 may be arranged in the same layer on the substrate 50, and a cover may be provided on the first electrode portion 1011, the connection portion 1012, the extended electrode group 30, and the second electrode portion 1021. Wherein, an insulating layer 40 is provided between the bridge portion 1022 and the connection portion 1012 to insulate the first electrode group 101 and the second electrode group 102, and the two second electrode portions 1021 located on both sides of the connection portion 1012 are electrically connected through the corresponding bridge portion 1022 and a conductor portion 1023 filled in a via hole, and the via hole is located on the bridge portion 1022 and penetrates the insulating layer. The connecting portion 1012, the second electrode portion 1021, and the insulating layer 40 may be provided with a protective layer 60 to insulate the touch layer 100 from other film layers located above the touch layer 100.

Further, in the first direction 03, the size of the first electrode portion 1011 may be larger than the size of the connecting portion 1012; in the second direction 04, the size of the second electrode portion 1021 may be larger than the size of the bridging portion 1022; and the first electrode portion 1011 and the second electrode portion 1021 may be arranged in engagement. In summary, a facing area between the first electrode portion 1011 and the second electrode portion 1021 may be increased, which further increases the parasitic capacitance between them, and meanwhile, the capacitance change amount of the parasitic capacitance between them is effectively increased.

Further, in combination with FIGS. 4 and 5, the bridge portion 1022 close to the extended electrode group 30 extends to be connected to the corresponding second lead 202. Wherein, "the bridge portion 1022 close to the extended electrode group 30" may be understood as the bridge portion 1022 closest to the extended electrode group 30. That is, the bridge portion 1022 disposed opposite to the extended electrode group 30 or close to the extended electrode group 30. That is to say, a plurality of the second electrode portions 1021 in the same second electrode group 102 may be electrically connected to a corresponding one of the second leads 202 through a plurality of the bridge portions 1022 to receive or transmit a signal.

Figure 7:
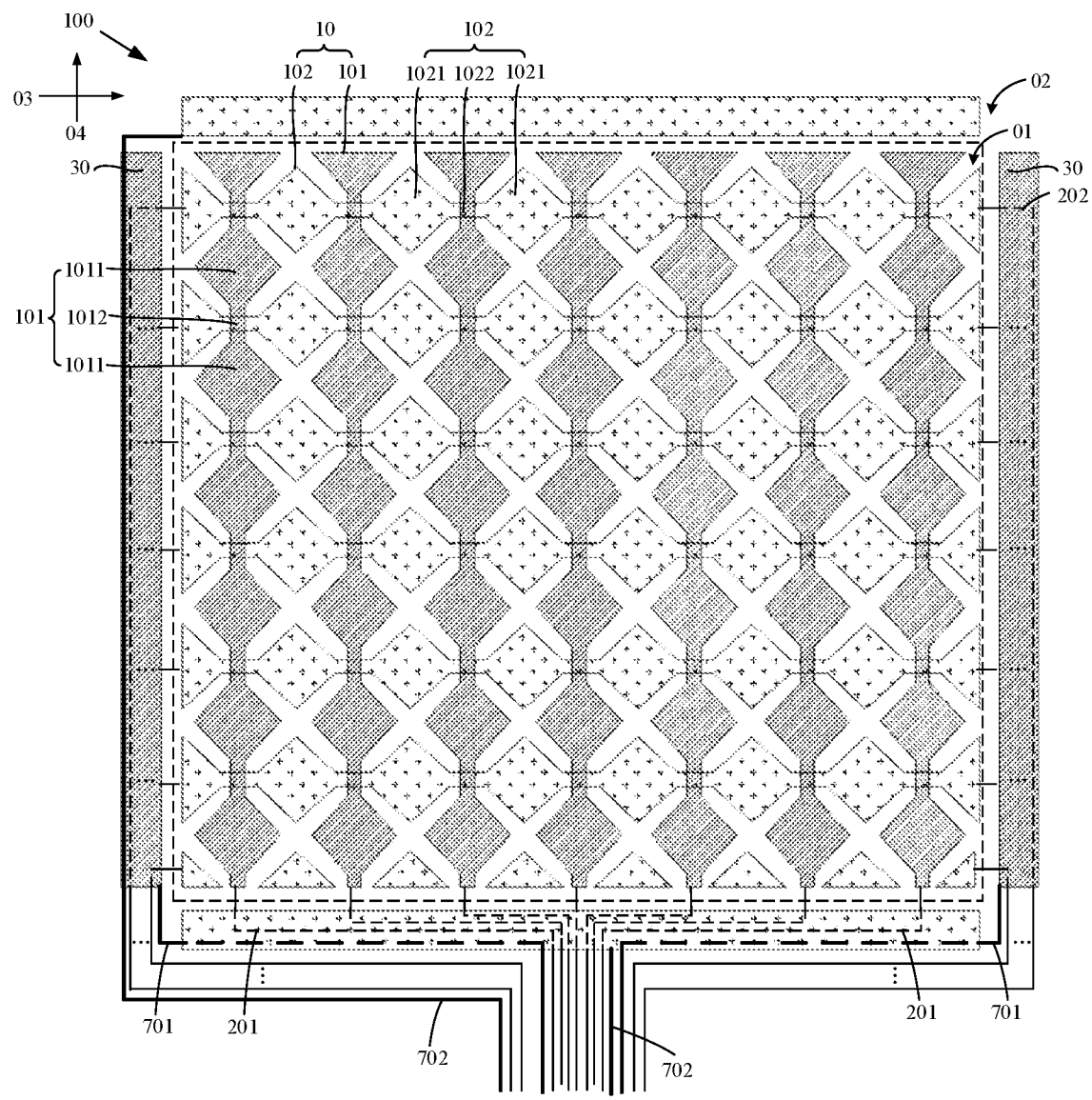
FIG. 7 is a schematic top view of a fourth touch layer according to an embodiment of the present application.

In an embodiment, as shown in FIG. 7, a plurality of the second electrode groups 102 do not extend beyond the display area 01, one side of a plurality of the second electrode groups 102 close to the non-display area 02 is flush with one side of a plurality of the first electrode groups 101 close to the non-display area 02; and wherein the extended electrode group 30 does not extend beyond the non-display area 02, and one side of the extended electrode group 30 away from the display area 01 is parallel to one side of the display area 01 close to the extended electrode group 30.

On the one hand, in the display area 01, one side of a plurality of the second electrode groups 102 close to the non-display area 02 is flush with one side of a plurality of the first electrode groups 101 close to the non-display area 02, so that the risk that the first electrode groups 101 or the second electrode groups 102 protrude from the touch electrode groups 10 to cause the extended electrode groups 30 to break. Further, as shown in FIG. 7, a plurality of the first electrode group 101 and the extended electrode group 30 may be arranged in engagement with a plurality of the second electrode group 102, so as to increase their facing areas to further increase the parasitic capacitance between them, and meanwhile, the capacitance change amount of the parasitic capacitance between them is effectively increased. Further, it is possible to prevent an outer side of a side of the touch layer 100 where the first electrode group 101 or the second electrode group 102 is arranged from showing multiple protruding shapes, thus reducing the risk of fracture or even failure of the first electrode group 101 or the second electrode group 102.

On the other hand, one side of the extended electrode group 30 away from the display area 01 is parallel to one side of the display area 01 close to the extended electrode group 30, that is, it is also possible to prevent one side of the extended electrode group 30 away from the display area 01 from protruding, which not only can prevent the extended electrode group 30 form occupying a larger space in the direction perpendicular to one side of the display area 01 close to the extended electrode group 30, but also can reduce the risk of breakage or even failure of the extended electrode group 30. It should be noted that in this embodiment, the shape of the extended electrode group 30 is not limited. In order to maximize the area of the extended electrode group 30, the extended electrode group 30 may be rectangular on the premise that the display area 01 is rectangular.

It should be noted that, in combination with the above contents, the extended electrode group 30 and a plurality of the second leads 202 are arranged opposite to each other. Further, as shown in FIG. 7, the head end and the tail end of each of the second electrode group 102 may be connected with the second leads 202, that is, a plurality of the second leads 202 may be distributed on the head end and the tail end of a plurality of the second electrode group 102. Correspondingly, a plurality of second lead wires 202 distributed at the head ends of a plurality of the second electrode groups 102 may be provided with corresponding extended electrode groups 30, and the second leads 202 distributed at the tail ends of a plurality of the second electrode groups 102 may also be provided with corresponding extended electrode groups 30.

In an embodiment, as shown in FIG. 7, the touch lead group further comprises a plurality of first leads 201 located in the non-display area 02 and corresponding one by one to a plurality of the first electrode groups 201, each of the first leads 201 is connected to the corresponding first electrode group 101, and the touch layer 100 further comprises: a first extended lead 701 between a plurality of the first leads 201 and a plurality of the second leads 202, the first extended lead 701 is connected to the extended electrode group 30; and wherein, when the touch electrode group 10 and the extended electrode group 30 are electrically connected to the target functional chip located in the non-display area 02, the first extended lead 701 and the touch lead group transmit an inductive signal, otherwise, the first extended lead 701 is electrically grounded.

Wherein, "otherwise" may be understood as a touch function stage. According to the above discussion, during the touch control stage, a plurality of the first electrode group 101 are sequentially loaded with a touch driving signal by a touch function chip. A plurality of touch sensing signals generated by a plurality of the second electrode groups are sequentially transmitted to a touch function chip through the corresponding plurality of second leads 202. That is, a plurality of the first leads 201 are used to transmit the touch driving signal, and a plurality of the second leads 202 are used to transmit the touch sensing signal. In this case, the first extended leads 701 located between a plurality of the first leads 201 and a plurality of the second leads 202 are electrically grounded to reduce the signal crosstalk between the first leads 201 and the second leads 202.

On this basis, during a target function stage, that is, when the touch electrode group 10 and the extended electrode group 30 are electrically connected to a target function chip located in the non-display area 02, specifically, the touch electrode group 10 is electrically connected to a target function chip through a touch lead group, and the extended electrode group 30 is electrically connected to a target function chip through a first extended lead 701. Herein, an active pen function is taken as an example of the target function for description, that is, the first extended lead 701 in this embodiment is multiplexed for grounding and transmitting sensing signals of an active pen, which improves the utilization rate of the circuit. Specifically, under the condition that an active pen sends signals to the touch electrode group 10 and the extended electrode group 30, the touch electrode group 10 transmits the generated sensing signals of an active pen to a target function chip through the touch lead group, and the extended electrode group 30 transmits the generated sensing signals of an active pen to a target function chip through the first extended lead 701.

Similarly, the extended electrode group 101 may be disposed opposite to a plurality of the first leads 201. Further, as shown in FIG. 7, at least one of the head end and the tail end of each of the first electrode group 101 may be connected with the first leads 201, that is, a plurality of the first leads 201 may be distributed at least one of the head end and the tail end of a plurality of the second electrode group 102. Specifically, herein, the first direction 03 is parallel to an upper bezel and a lower bezel of the touch panel, the second direction 04 is parallel to a left bezel and a right bezel of the touch panel, and the tail end of each of the first electrode groups 101 is connected with the first lead 201 are taken as examples for description. A plurality of the first leads 201 distributed at the tail end of a plurality of the second electrode groups 102 may be provided with the corresponding extended electrode groups 30, even if the first lead 201 is not connected to the head end of each of the first electrode groups 101. Considering that the upper bezel and the lower bezel of the touch panel may be generally provided with a wider width, in the non-display area 02, the extended electrode group 30 can also be arranged in the area close to the heads of the second electrode groups 102, and the extended electrode groups 30 close to the heads of the second electrode groups 102 and the extended electrode groups 30 close to the tails of the second electrode groups 102 can be electrically connected to a target functional chip through a second extended lead 702.

In combination with the above discussion, the extended electrode group 30 close to the head end of a plurality of the second electrode group 102 and the extended electrode group 30 close to the tail end of a plurality of the second electrode group 102 can be parallel to a plurality of the second electrode group 102. It can be understood that in this embodiment, the extended electrode group 30 parallel to the plurality of the second electrode group 102 are provided in the non-display area 102, so that the portion of a plurality of the second electrode group 102 close to an edge of the display area 01 can still keep a complete channel or have an adjacent channel in the direction away from the display area 01, thereby further reducing the risk of missing or incomplete channels related to a portion of the touch lead group close to an edge of the display area, and improving the writing reliability of an active pen on an edge of the touch panel.

Figure 8:
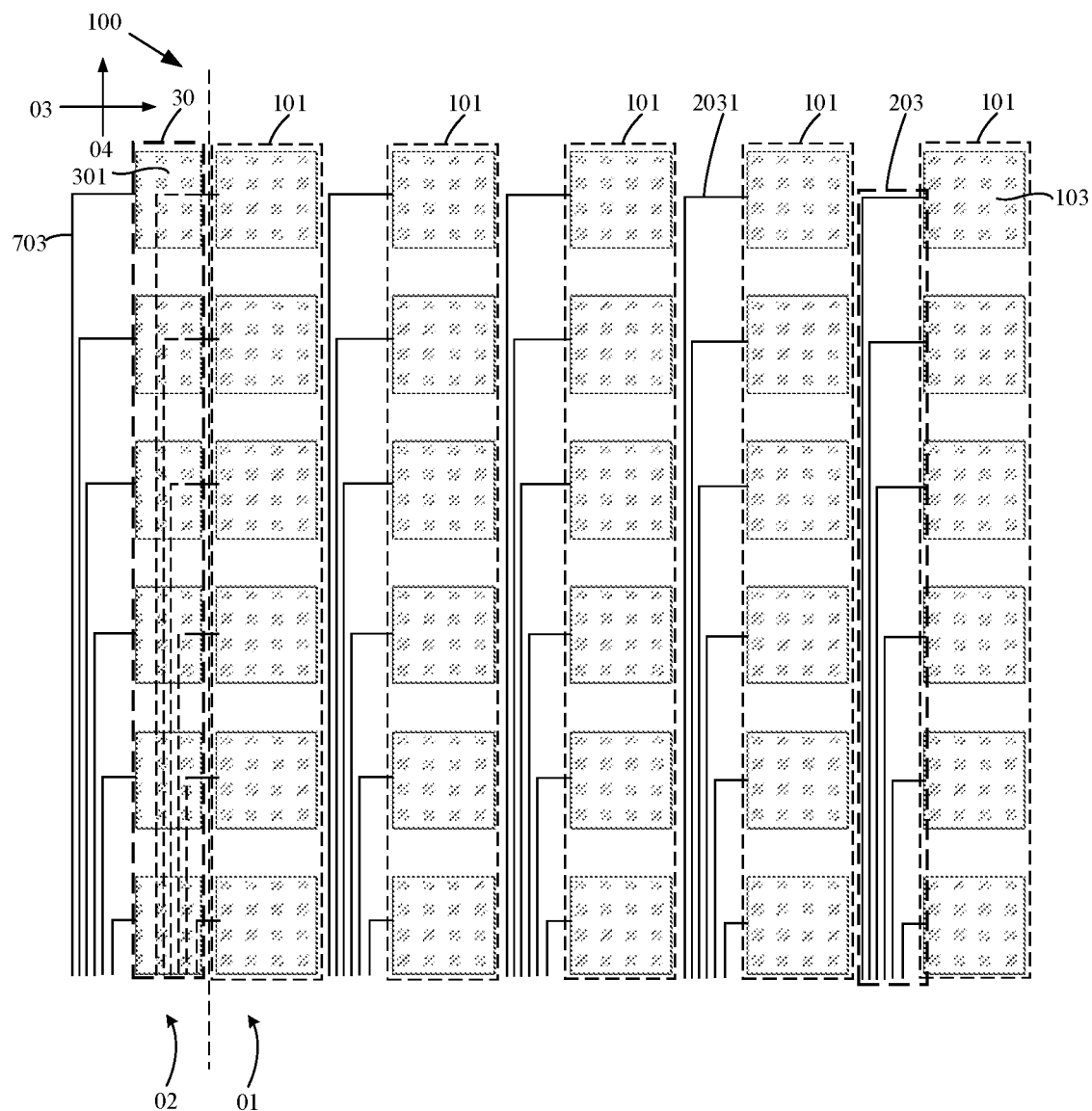
FIG. 8 is a schematic top view of a fifth touch layer according to an embodiment of the present application.

In an embodiment, as shown in FIG. 8, each of the first electrode groups 101 comprises a plurality of electrode blocks 103 arranged in an insulating manner along the second direction 04, and the touch lead group further comprises a plurality of third lead groups 203 corresponding one by one to the plurality of first electrode groups 101, the third lead groups 203 comprises a plurality of electrode leads 2031 corresponding to a plurality of the electrode blocks 103 in the corresponding first electrode groups 101, each electrode lead 2031 is connected to one side of the corresponding electrode block 103 close to the extended electrode group 30; wherein the extended electrode group 30 comprises a plurality of extended electrode blocks 301 arranged in an insulating manner along the second direction 04, and the plurality of extended electrode blocks 301 are disposed opposite to a plurality of the electrode leads 2031 corresponding to the first electrode group 102 of the non-display area 02.

Similarly, in this embodiment, the area where the portion of a plurality of the third lead groups 203 located in the non-display area 02 is multiplexed, so that the area used to achieve the target function can cover the non-display area 02 without increasing the size of the narrow bezel, thus a portion of a plurality of the electrodes 103 close to an edge of the display area 01 may still keep a complete channel or have an adjacent channel in the direction away from the display area 01, thereby reducing the risk of missing or incomplete channels related to a plurality of the electrodes 103 close to an edge of the display area 01, and improving the writing reliability of an active pen on an edge of the touch panel.

Specifically, this embodiment differs from the embodiment shown in FIG. 4 in that a plurality of electrode blocks 103 in this embodiment realize a touch function by self-containment, so that each of the electrode blocks 103 may be electrically connected to a touch chip through a corresponding electrode lead 2031. Similarly, herein, an active pen function is taken as an example of the target function for description, that is, during an active pen function stage, each of the electrode blocks 103 is electrically connected to a target function chip through a corresponding electrode lead 2031, and each of the extended electrode blocks 301 is electrically connected to a target function chip through a corresponding third extended lead 703. Wherein, the third extended lead 703 may be arranged in the same layer as a plurality of the electrode leads 2031, and arranged opposite to a corresponding extended electrode block 301. It should be noted that, in the first direction 03, since the overall size of a plurality of the third lead groups 203 is limited, the size of the extended electrode block 301 may be smaller than the size of the electrode block 301, so as to avoid an excessive size of the extended electrode block 301 beyond the overall size of a plurality of the third lead groups 203. Further, the third extended lead 703 may be located on one side of the extended electrode block 301 away from the display area 01, wherein, the touch chip and the target function chip may be integrated in the same chip.

Figure 9:
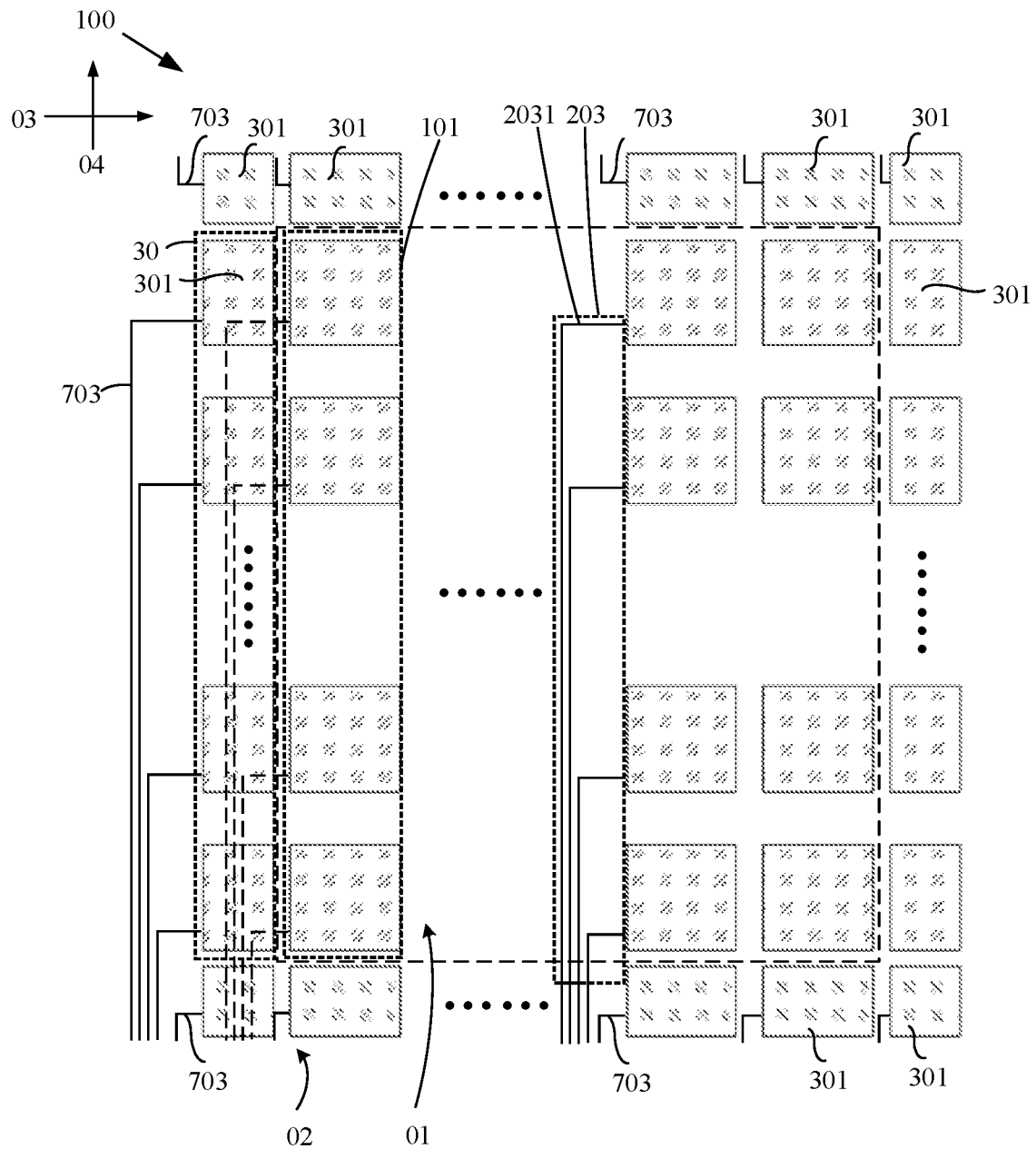
FIG. 9 is a schematic top view of a sixth touch layer according to an embodiment of this application.

It should be noted that all the above embodiments are based on that the extended electrode group 30 overlaps at least a portion of the touch lead group located in the non-display area 02, that is, the position and manner of the distribution of the extended electrode group 30 is related to the position and manner of the distribution of the touch lead group. In combination with the above discussion, as shown in FIG. 8, the third lead group 203 extends in the second direction 04, so the extended electrode group 30 may comprise a plurality of extended electrode blocks 301 located on the left or right side of a plurality of first electrode groups 101 and insulated in the second direction 04. Further, as shown in FIG. 9, on the basis of FIG. 8 (taking a plurality of extended electrode blocks 301 located on the left side of a plurality of first electrode groups 101 as an example), the extended electrode groups 101 may further comprises at least one of a plurality of extended electrode blocks 301 located on a right side of a plurality of first electrode groups 101 and insulated in the second direction 04, a plurality of extended electrode blocks 301 located on an upper side of a plurality of first electrode groups 101 and insulated in the first direction 03, and a plurality of extended electrode blocks 301 located on a lower side of a plurality of first electrode groups 101 and insulated in the first direction 03. Of course, the above embodiments are established on the basis that the extended electrode groups 101 overlap at least a portion of the third lead group 203 (not shown) located in the non-display area 02, that is, the third lead group 203 is also provided in a region provided with the extended electrode groups 30. It can be understood that the larger the range of the extended electrode group 30 surrounds a plurality of the first electrode group 101, the risk of missing or incomplete channels related to a portion of the touch electrode group close to an edge of the display area can be reduced in more directions, which further improves the writing reliability of an active pen on an edge of the touch panel.

In an embodiment, a plurality of the touch electrode groups 10 and the extended electrode group 30 comprise a metal grid, and the touch electrode groups 10 and the extended electrode group 30 are arranged in an insulating manner through a fracture of the metal grid. Specifically, the first electrode group 101 and the second electrode group 102 may be arranged in an insulating manner through a fracture of the metal grid, two adjacent first electrode groups 101 may be arranged in an insulating manner through a fracture of the metal grid, and two adjacent second electrode groups 102 may be arranged in an insulating manner through a fracture of the metal grid. Wherein, at least one of the touch lead group, the first extended lead 701, and the second extended lead 702 may be constituted by a metal mesh or a metal wire. It can be understood that the materials and unit structures for forming the touch electrode group 10 and the extended electrode group 30 by using the metal grid may be the same. According to the above analysis, the difference of the film structure of the touch layer 100 may be further reduced, so as to maintain the uniformity of the light emitted by sub-pixels in different regions of the touch layer 100. Specifically, the fracture is formed at an edge of the metal grid, and the distance between any two adjacent fracture is sufficient for insulation.

Specifically, the metal grid may comprise a metal structure and a plurality of hollow areas surrounded by the metal structure. Further, the metal structure may comprise a closed-shaped metal frame and a metal connection line connected between the two metal frames, and the metal connection line electrically connects the corresponding two metal frames. Wherein, a projection of the metal structure on a cathode layer may be, but is not limited to, an ellipse, a circle or a rectangular frame. Further, one side edge of the metal frame located at an edge of the metal mesh may form a boundary seal of the metal mesh, and of course, the metal connection line located at an edge of the metal mesh or the incomplete seal of the metal frame may also form the boundary seal. Further, each of the sub-pixels may be located inside a corresponding hollow area, so that the metal mesh may avoid blocking any of the sub-pixels, thereby avoiding reducing the amount of light emitted by the touch panel.

The present application further provides a mobile terminal, the mobile terminal comprises a terminal body and a touch panel as described above, and the terminal body and the touch panel are integrated. The mobile terminal may be, but is not limited to, a display device such as a mobile phone, a computer, or a watch.

Embodiments of the present application provide a touch panel and a mobile terminal. The touch panel comprises a display area and a non-display area surrounding the display area, the touch panel comprises a touch layer, and the touch layer comprises a touch electrode group located in the display area; a touch lead group located at least in the non-display area and electrically connected to the touch electrode group; an extended electrode group overlapping at least a portion of the touch lead group located in the non-display area; wherein the touch electrode group and the extended electrode group are electrically connected to a target function chip located in the non-display area to achieve a target function. Wherein, the touch electrode group and the extended electrode group are electrically connected to a target function chip located in the non-display area to achieve a target function. Wherein, in the solution of the present application, the extended electrode group which realizes the target function together with the touch electrode group is further arranged in the portion overlapping the touch lead group located in the non-display area, so that the portion of the touch electrode group close to an edge of the display area can still keep a complete channel or have an adjacent channel in the direction away from the display area, thereby reducing the risk of missing or incomplete channels related to a portion of the touch lead group close to an edge of the display area, and improving the writing reliability of an active pen on an edge of the touch panel.

The touch panel and the mobile terminal provided in the embodiments of the present application are described in detail above. The principles and embodiments of the present application are described by using specific embodiments herein. The description of the embodiments is merely intended to help understand the technical solutions and core ideas of the present application. A skilled person in the art shall understand that he may still modify the technical solutions described in the foregoing embodiments, or equivalently replace some of the technical features thereof. These modifications or substitutions do not separate the nature of the corresponding technical solutions from the technical solutions of the embodiments of the present application.

What is claimed is:

1. A touch panel, wherein the touch panel comprises a display area and a non-display area surrounding the display area, the touch panel comprises a touch layer, and the touch layer comprises:
   a touch electrode group located in the display area;
   a touch lead group located at least in the non-display area and electrically connected to the touch electrode group;
   an extended electrode group overlapping at least a portion of the touch lead group located in the non-display area;
   wherein the touch electrode group comprises a plurality of first electrode groups arranged in parallel with the extended electrode groups and extending along a second direction; and the touch electrode group comprises a plurality of second electrode groups arranged in parallel and intersecting with a plurality of the first electrode groups;
   wherein the touch electrode group and the extended electrode group are electrically connected to a target function chip located in the non-display area for achieving a target function; and
   wherein the plurality of the second electrode groups do not extend beyond the display area, one side of a plurality of the second electrode groups close to the non-display area is flush with one side of a plurality of the first electrode groups close to the non-display area; and wherein the extended electrode group does not extend beyond the non-display area, and one side of the extended electrode group away from the display area is parallel to one side of the display area close to the extended electrode group.

2. The touch panel according to claim 1, wherein the extended electrode groups are located at least on one side of the plurality of first electrode groups close to the non-display area.

3. The touch panel according to claim 1, wherein in two ones of the plurality of first electrode groups close to the extended electrode group, an area of the extended electrode group is greater than or equal to an area of one of the two ones of the plurality of first electrode groups, and is less than or equal to an area of the other of the two ones of the plurality of first electrode groups.

4. The touch panel according to claim 1, wherein the touch lead group comprises a plurality of second leads located in the non-display area and corresponding one by one to a plurality of the second electrode groups, each of the second leads is connected to a portion of the corresponding second electrode group close to the extended electrode group, and the extended electrode group and a plurality of the second leads are disposed opposite to each other.

5. The touch panel according to claim 4, wherein the extended electrode group is located within a range defined by a portion of the corresponding plurality of the second leads within the non-display area.

6. The touch panel according to claim 4, wherein in the first direction, a plurality of the second electrode groups extend from the display area to the non-display area, and one side of a plurality of the second electrode groups away from the display area is flush with one side of the extended electrode groups away from the display area.

7. The touch panel according to claim 4, wherein a plurality of the second electrode groups do not extend beyond the display area, one side of a plurality of the second electrode groups close to the non-display area is flush with one side of a plurality of the first electrode groups close to the non-display area; and
   wherein the extended electrode group does not extend beyond the non-display area, and one side of the extended electrode group away from the display area is parallel to one side of the display area close to the extended electrode group.

8. The touch panel according to claim 1, wherein each of the second electrode groups comprises a plurality of second electrode portions arranged along the first direction, and the first electrode group and a bridge portion positioned in a different layer are provided between two adjacent second electrode portions; and
   wherein the bridge portion and the corresponding first electrode group are insulated, each of the second leads and the corresponding plurality of bridge portions are arranged in the same layer, and the bridge portion close to the extended electrode group extends to be connected to the corresponding second lead.

9. The touch panel according to claim 1, wherein the touch lead group further comprises a plurality of first leads located in the non-display area and corresponding one by one to a plurality of the first electrode groups, each of the first leads is connected to the corresponding first electrode group, and the touch layer further comprises:
   a first extended lead between a plurality of the first leads and a plurality of the second leads, the first extension lead being connected to the extension electrode group; and
   wherein, when the touch electrode group and the extended electrode group are electrically connected to the target functional chip located in the non-display area, the first extended lead and the touch lead group transmit an inductive signal, otherwise, the first extended lead is electrically grounded.

10. The touch panel according to claim 1, wherein each of the first electrode groups comprises a plurality of electrode blocks arranged in an insulating manner along the second direction, and the touch lead group further comprises:

a plurality of third lead groups corresponding one by one to the plurality of first electrode groups, the third lead groups comprising a plurality of electrode leads corresponding to a plurality of the electrode blocks in the corresponding first electrode groups, each electrode lead is connected to one side of the corresponding electrode block close to the extended electrode group;

wherein the extended electrode group comprises a plurality of extended electrode blocks arranged in an insulating manner along the second direction, and the plurality of extended electrode blocks are disposed opposite to a plurality of the electrode leads corresponding to the first electrode group of the non-display area.

11. The touch panel according to claim 1, wherein a plurality of the touch electrode group and the extended electrode group comprise a metal grid, and the touch electrode group and the extended electrode group arranged in an insulating manner through a fracture of the metal grid.

12. A mobile terminal, wherein the mobile terminal comprises a terminal body and the touch panel according to claim 1, and the terminal body and the touch panel are integrated.

* * * * *